(12) United States Patent
Ito et al.

(10) Patent No.: US 7,685,153 B2
(45) Date of Patent: Mar. 23, 2010

(54) PERSONAL CONNECTION NETWORK ANALYSIS APPARATUS AND METHOD, STORAGE MEDIUM STORING PERSONAL CONNECTION NETWORK ANALYSIS PROGRAM ORGANIZATIONAL RIGIDITY DETERMINATION APPARATUS AND METHOD, AND STORAGE MEDIUM STORING ORGANIZATIONAL RIGIDITY DETERMINATION PROGRAM

(75) Inventors: Atsushi Ito, Kanagawa (JP); Masakazu Fujimoto, Kanagawa (JP); Nobuhiro Yamasaki, Kanagawa (JP); Noriyuki Kurabayashi, Kanagawa (JP); Yuichi Ueno, Kanagawa (JP); Masamichi Takahashi, Kanagawa (JP); Keiichi Nemoto, Kanagawa (JP)

(73) Assignee: Fuji Xerox Corporation, Tokyo (JP)

( * ) Notice: Subject to any disclaimer, the term of this patent is extended or adjusted under 35 U.S.C. 154(b) by 251 days.

(21) Appl. No.: 11/401,377

(22) Filed: Apr. 11, 2006

(65) Prior Publication Data
US 2007/0094327 A1   Apr. 26, 2007

(30) Foreign Application Priority Data
Aug. 23, 2005   (JP)   ............................. 2005-241537

(51) Int. Cl.
*G06F 7/00* (2006.01)
(52) U.S. Cl. .................... 707/102; 707/104.1; 702/187
(58) Field of Classification Search ....................... None
See application file for complete search history.

(56) References Cited

U.S. PATENT DOCUMENTS

2002/0062368 A1 * 5/2002 Holtzman et al. ........... 709/224
2002/0116170 A1 * 8/2002 Corman et al. ................... 704/1
2003/0167324 A1 * 9/2003 Farnham et al. ............. 709/224
2004/0198398 A1 * 10/2004 Amir et al. ............... 455/456.6
2004/0215648 A1 * 10/2004 Marshall et al. ............. 707/102
2005/0246421 A1 * 11/2005 Moore et al. ................ 709/204

(Continued)

FOREIGN PATENT DOCUMENTS

JP   B2 3446886   7/2003

OTHER PUBLICATIONS

Boguña, Marián, Romualdo Pastor-Satorras, Albert Díaz-Guilera, and Alex Arenas. "Models of social networks based on social distance attachment." American Physical Society 70(2004) 056122. Mar. 3, 2008 <http://prola.aps.org/abstract/PRE/v70/i5/e056122>.*

(Continued)

*Primary Examiner*—Mohammad Ali
*Assistant Examiner*—Syed H Hasan
(74) *Attorney, Agent, or Firm*—Oliff & Berridge, PLC

(57) ABSTRACT

A personal connection network analysis apparatus includes: event history holding means for holding histories of events related to organization members; relation calculation means for extracting, from the event history holding means, histories of events common to both a first member of the organization members and second members of the organization members and calculating a relation between the second members based on the extracted histories of events; and network information holding means for holding the calculated relation as link information between nodes of a personal connection network unique to the first members, the nodes being respectively indicative of the second members in the personal connection network unique to the first member.

11 Claims, 13 Drawing Sheets

DESCRIPTION OF NETWORK EVERY USER OF THIS INVENTION

U.S. PATENT DOCUMENTS

2006/0042483 A1* 3/2006 Work et al. .................. 101/91

OTHER PUBLICATIONS

Katz, Ralph et al., "Investigating the Not Invented Here (NIH) Syndrome: A look at the performance, tenure, and communication patterns of 50 R&D Project Groups," R&D Management, 1982, vol. 12, No. 1, pp. 7-19.

Henderson, Rebecca et al., "Architectural Innovation: The Reconfiguration of Existing Product Technologies and the Failure of Established Firms," Administrative Science Quarterly, 1990, vol. 35, No. 1, pp. 9-30.

* cited by examiner

FIG. 2
NETWORK OF USER 1
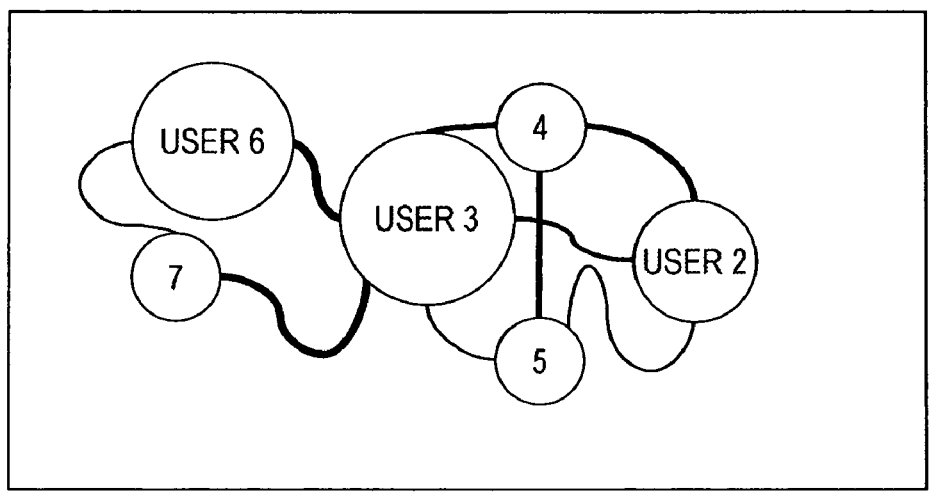
NETWORK OF USER 2
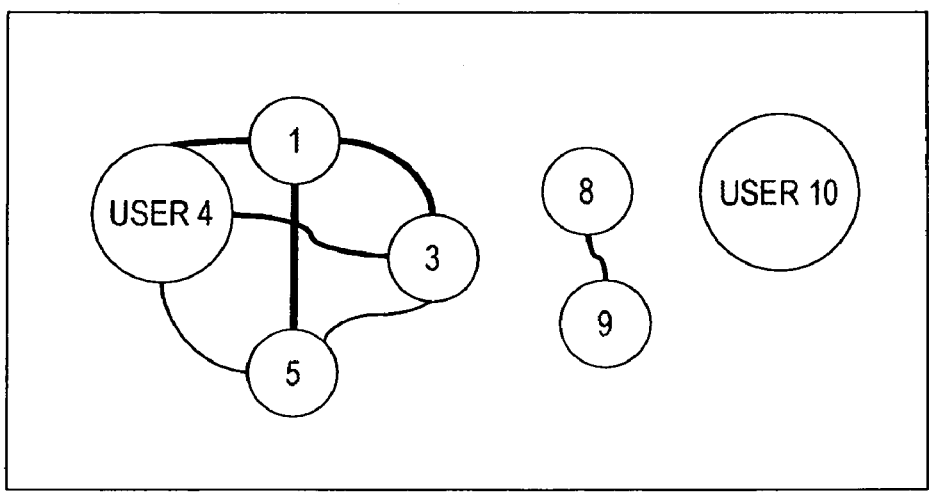
EXAMPLE OF NETWORK EVERY USER OF THE INVENTION

CONFIGURATION OF FIRST EMBODIMENT

CONFIGURATION EXAMPLE OF POSITION INFORMATION DETECTION PART

FIG. 7

| AREA ID | NOTATION | TYPE |
|---|---|---|
| AREA-101 | MEETING ROOM 51 | MEETING ROOM |
| AREA-102 | LIVING ROM 5F SOUTH | LIVING ROM |
| ⋮ | ⋮ | ⋮ |

EXAMPLE OF AREA INFORMATION

FIG. 8

| USER ID | NAME | AFFILIATION | CONTACT ADDRESS | LIVING ROOM |
|---|---|---|---|---|
| USER-1001 | ○YAMA△O | RESEARCH CENTER | maruyama@example.com | AREA-102 |
| USER-1002 | ◎ ■KO | RESEARCH CENTER | nijyumaru@example.com | AREA-102 |
| ⋮ | ⋮ | ⋮ | ⋮ | ⋮ |

EXAMPLE OF USER INFORMATION

FIG. 9

| AREA ID | REFERENCE TO USER ID LIST | START TIME | END TIME |
|---|---|---|---|
| AREA-102 | LIST-45 | 2005-03-01-12:29:38 | 2005-03-01-12:31:54 |
| AREA-101 | LIST-47 | 2005-03-01-12:31:21 | 2005-03-01-12:33:01 |
| ⋮ | ⋮ | ⋮ | ⋮ |

| LIST-45 |
|---|
| USER-1001 |
| USER-1033 |
| ⋮ |

EXAMPLE OF POSITION DETECTION INFORMATION

FIG. 10

USER 1001

| | |
|---|---|
| ACCUMULATED TIME OF TIME FOR WHICH USER 4951 AND USER 2349 ARE TOGETHER WITH USER 1001 | 2981 |
| ELAPSED TIME FROM THE LAST TIME AT WHICH USER 4951 AND USER 2349 ARE TOGETHER WITH USER 1001 | 2 |

EXAMPLE OF ELAPSED TIME AND ACCUMULATED TIME FOR WHICH THREE PERSONS ARE TOGETHER

FIG. 11

USER 1001

| | |
|---|---|
| ACCUMULATED TIME OF TIME FOR WHICH USER 4951 IS TOGETHER WITH USER 1001 | 4915 |
| ELAPSED TIME FROM THE LAST TIME AT WHICH USER 4951 IS TOGETHER WITH USER 1001 | 2 |

EXAMPLE OF ELAPSED TIME AND ACCUMULATED TIME FOR WHICH TWO PERSONS ARE TOGETHER

FIG. 12

| ENDPOINT 1 | ENDPOINT 2 | LINK STRENGTH |
|---|---|---|
| USER-4951 | USER-2349 | 7.3 |
| USER-1002 | USER-4951 | 6.4 |
| ⋮ | ⋮ | ⋮ |

EXAMPLE OF LINK STRENGTH

FIG. 13

USER-1001

| NODE (ENDPOINT) | NODE STRENGTH |
|---|---|
| USER-4951 | 7.8 |
| USER-1002 | 6.9 |
| ⋮ | ⋮ |

EXAMPLE OF NODE STRENGTH

ACTION EXAMPLE OF FIRST EMBODIMENT

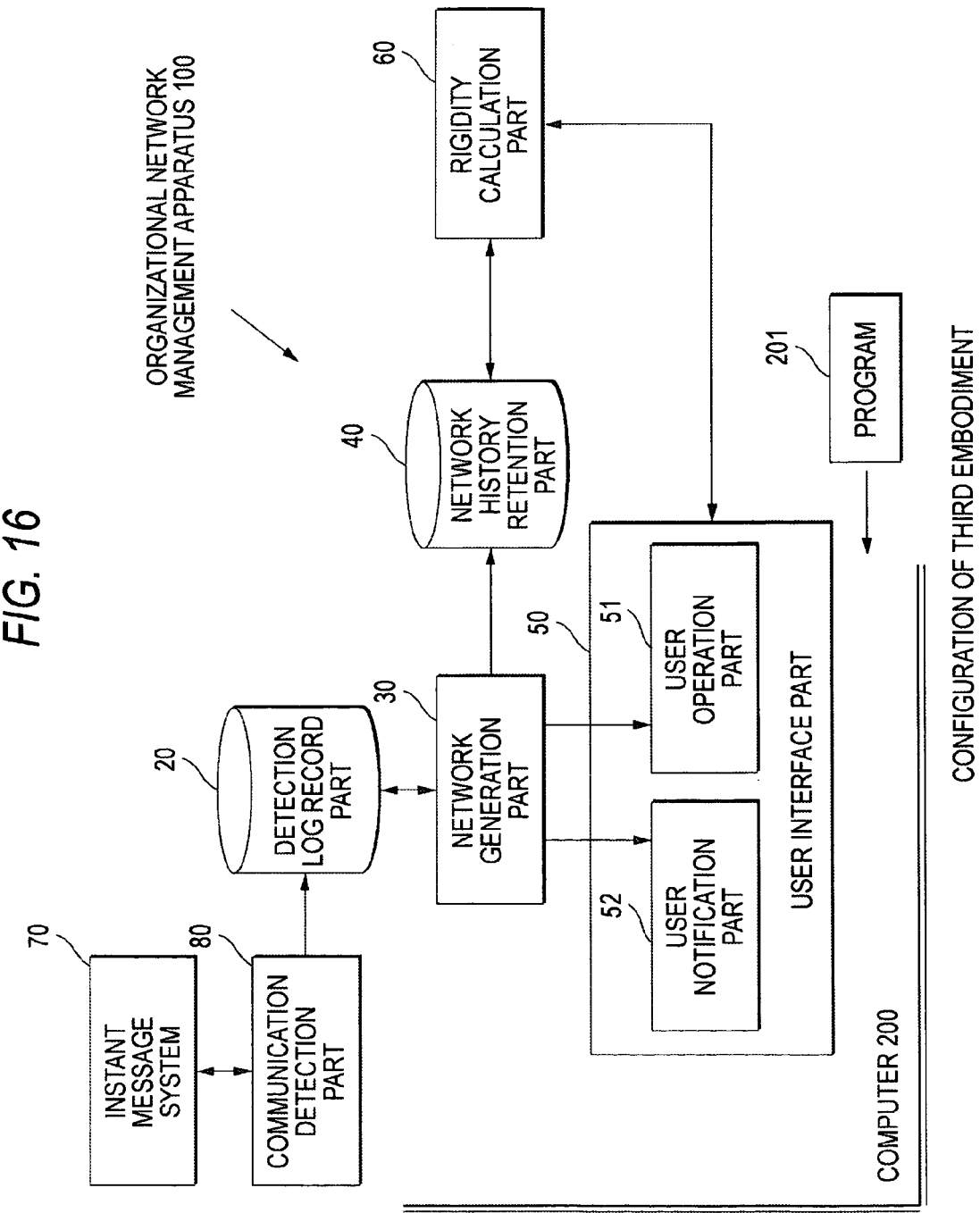

PERSONAL CONNECTION NETWORK ANALYSIS APPARATUS AND METHOD, STORAGE MEDIUM STORING PERSONAL CONNECTION NETWORK ANALYSIS PROGRAM ORGANIZATIONAL RIGIDITY DETERMINATION APPARATUS AND METHOD, AND STORAGE MEDIUM STORING ORGANIZATIONAL RIGIDITY DETERMINATION PROGRAM

BACKGROUND OF THE INVENTION (i) Field of the Invention

This invention relates to a technique for analyzing a personal connection network and particularly, is a technique most suitable to determine organizational rigidity.

(ii) Description of the Related Art

A state of a small change in the contents and forms of communication in an organization is called "organizational rigidity". It is essential to diagnose the degree of "organizational rigidity" and take proper measures in the case of establishing a creative and active organization. The degree of "organizational rigidity" can be examined by various methods. For example, a phenomenon of an NIH syndrome (Not Invented Here Syndrome, Non-patent Reference 1) is known in business administration, and a relation in which a project decreases in performance when the amount of communication of the outside of an organization decreases for a research project or a development project and when the amount of communication of the inside of an organization decreases for a project of technical service has become apparent. Also, Architectural Innovation (Non-patent Reference 2) advocated by Rebecca M. Henderson and Kim B. Clart points out that a certain kind of innovation tends to occur by an informal information exchange between mutual organizations having a distant relation until now. Thus, by measuring and analyzing dialogue actions over the whole company organizational activity, an aspect of the company organizational activity can be searched and thereby, organizational managers or executive officers are made to recognize the present situation of the company organization and a reduction in business performance of a company is prevented and some improvement plans for increasing higher business performance can be suggested.

The present inventors et al. have keenly studied about determination of the degree of "organizational rigidity" by focusing on personal connection information, and have achieved this invention. Incidentally, "personal connection" shall widely refer to a relation among people. Also, the term "a personal connection network" is below used and this shall widely refer to a network formed by a relation among people.

Incidentally, a patent reference related to the invention includes Patent Reference 1. This is not means for directly performing "diagnosis of organizational rigidity based on personal connection information", but proposes a use method or a processing method of personal connection information.

In "a personal connection data management system and a personal connection search method" of Patent Reference 1, a (so-called Know-Who database) system for generating personal connection information from business data such as a business daily report and a message such as electronic mail and searching a person is proposed. However, personal connection information is generated from records of formal communication or electronic communication, so that connection with an informal person such as "a person being together often" cannot be handled. Also, a difference between personal connection information every organizational member cannot be handled. Further, processing for comparing an organizational state viewed from one member with an organizational state viewed from another member and analyzing the organization cannot be performed.

Patent Reference 1: Japanese Patent No. 3,446,886

Non-patent Reference 1: R&D Management, 1982, 12, pp. 7-19, Katz, Ralph and Thomas J. Allen Non-patent Reference 2: Administrative Science Quarterly, 1990, 35, pp. 9-30

SUMMARY OF THE INVENTION

The invention has been implemented in consideration of the circumstances described above.

This invention provides, as an illustrative, non-limiting embodiment, a personal connection network analysis apparatus comprising: event history holding means for holding histories of events related to organization members; relation calculation means for extracting, from the event history holding means, histories of events common to both a first member of the organization members and second members of the organization members and calculating a relation between the second members based on the extracted histories of events; and network information holding means for holding the calculated relation as link information between nodes of a personal connection network unique to the first members, the nodes being respectively indicative of the second members in the personal connection network unique to the first member.

This invention further provides, as an illustrative, non-limiting embodiment, a personal connection network analysis method comprising the steps of: holding histories of events related to organization members; extracting, from the held histories of events, histories of events common to both a first member of the organization members and second members of the organization members and calculating a relation between the second members based on the extracted histories of events; and holding the calculated relation as link information between nodes of a personal connection network unique to the first members, the nodes being respectively indicative of the second members in the personal connection network unique to the first member.

This invention further provides, as an illustrative, non-limiting embodiment, a storage medium readable by a computer, the storage medium storing a program of instructions executable by the computer to perform a function for a personal connection network analysis, the function comprising the steps of: holding histories of events related to organization members; extracting, from the held histories of events, histories of events common to both a first member of the organization members and second members of the organization members and calculating a relation between the second members based on the extracted histories of events; and holding the calculated relation as link information between nodes of a personal connection network unique to the first members, the nodes being respectively indicative of the second members in the personal connection network unique to the first member.

This invention further provides, as an illustrative, non-limiting embodiment, an organizational rigidity determination apparatus comprising: event history holding means for holding histories of events related to organization members; relation calculation means for extracting, from the event history holding means, histories of events common to both each of selected members of the organization members and other members of the organization members and calculating a relation between the other members for each of the selected members based on the extracted histories of events; network information holding means for holding the calculated relation between the other members for each of the selected members as link information of a respective one of personal connection networks that are respectively unique to the selected members, the nodes being respectively indicative of the other members in the personal network unique to each of the selected members; and rigidity decision means for deciding organization rigidity by mutually comparing the personal connection networks, respectively unique to the selected members, using the link information of the personal connection networks.

This invention further provides, as an illustrative, non-limiting embodiment, an organizational rigidity determination method comprising the steps of: holding histories of events related to organization members; extracting, from the held histories of events, histories of events common to both each of selected members of the organization members and other members of the organization members and calculating a relation between the other members for each of the selected members based on the extracted histories of events; holding the calculated relation between the other members for each of the selected members as link information of a respective one of personal connection networks that are respectively unique to the selected members, the nodes being respectively indicative of the other members in the personal network unique to each of the selected members; and deciding organization rigidity by mutually comparing the personal connection networks, respectively unique to the selected members, using the link information of the personal connection networks.

This invention further provides, as an illustrative, non-limiting embodiment, a storage medium readable by a computer, the storage medium storing a program of instructions executable by the computer to perform a function for an organizational rigidity determination, the function comprising the steps of: holding histories of events related to organization members; extracting, from the held histories of events, histories of events common to both each of selected members of the organization members and other members of the organization members and calculating a relation between the other members for each of the selected members based on the extracted histories of events; holding the calculated relation between the other members for each of the selected members as link information of a respective one of personal connection networks that are respectively unique to the selected members, the nodes being respectively indicative of the other members in the personal network unique to each of the selected members; and deciding organization rigidity by mutually comparing the personal connection networks, respectively unique to the selected members, using the link information of the personal connection networks.

Accordingly, one of advantages is such that a personal connection network analysis technique suitable to analyze a personal relation from the standpoint of individual members can be implemented and particularly, a personal connection network analysis technique suitable to determine organizational rigidity can be provided.

BRIEF DESCRIPTION OF THE DRAWINGS

Embodiments of the present invention will be described in detail based on the following figures, wherein:

FIG. 2 is a diagram describing examples of displaying the egocentric network of FIG. 1 with a focused user change;

FIG. 7 is a diagram describing an example of area information of the first embodiment;

FIG. 8 is a diagram describing an example of user information of the first embodiment;

FIG. 9 is a diagram describing an example of a log of position information every a set of users (there are cases of one user) of the first embodiment;

FIG. 10 is a diagram describing an example of a record of three-person accumulated time and three-person elapsed time of the first embodiment;

FIG. 11 is a diagram describing an example of a record of two-person accumulated time and two-person elapsed time of the first embodiment;

FIG. 12 is a diagram describing an example of a record of link strengths of the first embodiment;

FIG. 13 is a diagram describing an example of a record of node strengths of the first embodiment;

FIG. 16 is a diagram showing a configuration of a third embodiment of the invention as a whole.

DETAILED DESCRIPTION OF THE INVENTION

In a principle configuration example of the invention, an organizational network unique to each of the members is generated based on position information. Hereinafter, this network is also called an "egocentric network". The "egocentric network" is generally the term on society network analysis, and refers to a network in which a particular actor connects in my surroundings, and is used for analyzing what relation a social actor forms to other actors. In a general "egocentric network", the member in question exists in its center. On the other hand, an "egocentric network" used in the configuration example of the invention is an organizational network unique to each of the members constructed by extracting relations of other members in connection with each of the members, and the member in question is not described as a node in the organizational network unique to the member in question.

It is seen whether or not a form of the organizational communication is a varied form by seeing a difference between networks every member.

Also, the egocentric network is useful in the case where position information logs of organizational members cannot be collected in one intensive service because of some constraint (for example, the case of being constructed so that a log of a certain user is retained in only a device carried by the user from the standpoint of privacy protection or GPS).

Figure 1:
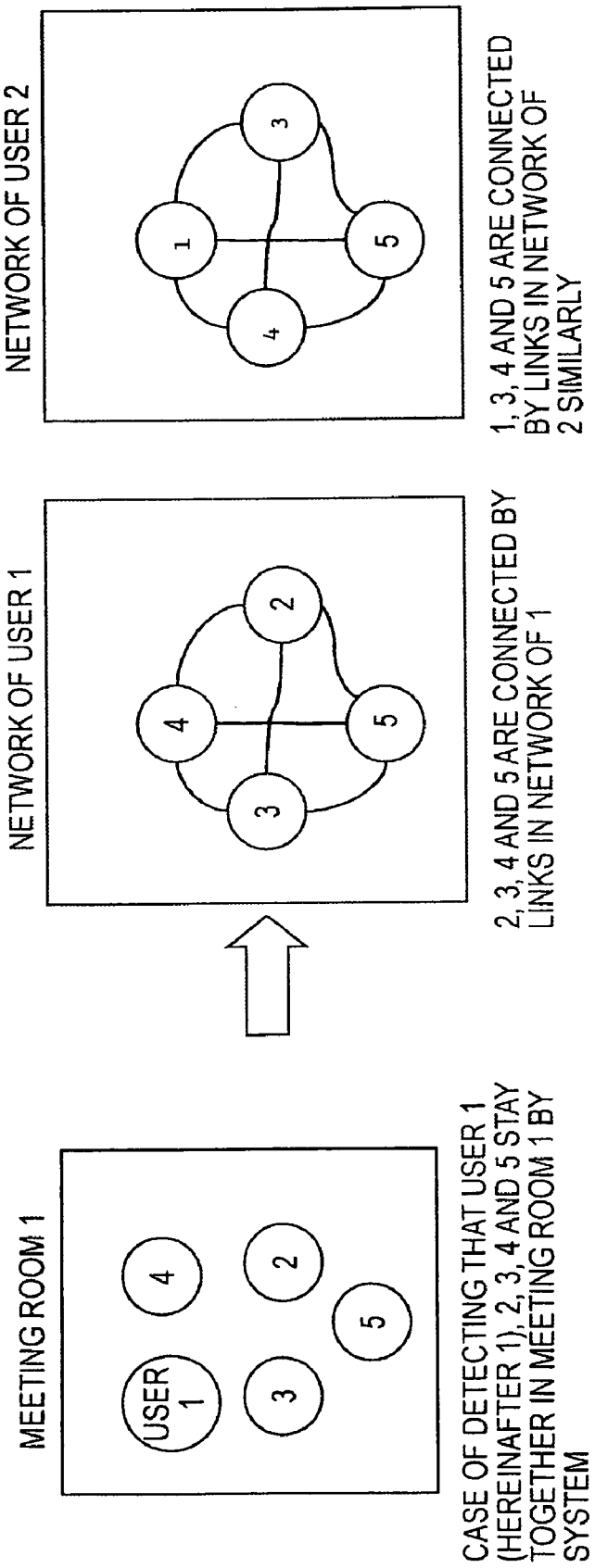
FIG. 1 is a diagram describing an egocentric network used in a principle configuration of this invention.

FIG. 1 shows an example of an organizational network described in a principle configuration example of the invention and, for example, users u1 to u5 stay in a meeting room 1 and in the case of detecting that the users stay in the meeting room by a position information detection system, a network in which each of the users u2 to u5 is connected by links is formed in an organizational network unique to the user u1 and a network in which each of the user 1 and the users u3 to u5 is connected by links is formed in an organizational network unique to the user u2. The organizational network unique to the user u1 provides the links between other mutual users staying in the room together with the user u1. Similarly, the organizational network unique to the user u2 provides the links between other mutual users staying in the room together with the user u2. The same applies to organizational networks unique to the other users.

FIG. 2 shows display examples of links. FIG. 2 shows an organizational network in a relation to a user u1, and indicates that users u2 to u6 are together with the user u1 in the same place. In addition, when links are provided between nodes of users, it is indicated that the user is in common with the user u1 in the same place. In FIG. 2, a link to other user nodes is not provided in a user u10. This indicates that other users are absent when the user u10 and the user u2 are in the same place.

In FIG. 2, a strong link is formed as the number (or accumulated time) of cases where users are together is large. In an example of FIG. 2, a link of 3-5 is weaker than that of 3-4 in a network of the user u1. This indicates that the number of cases where 1 is together with 3, 5 in the same place is smaller than the number of cases where 1 is together with 4, 3 in the same place.

In an example of a network of the user u2 of FIG. 2, separately from a network of 1-3-4-5, there are a network of 8-9 and a network of 10 (single node).

In calculation of a link strength, different variations can be adopted (for example, linear with respect to the number of cases, logarithm of the number of cases, logarithm of accumulated time).

Also, it is contemplated to perform weighting according to a place in which users are together. For example, the case of being together in a meeting room is weighted so as to have a stronger connection than the case of being together in a living room.

Further, "strength" may be set in each of the nodes. This indicates the number (accumulated time) of cases where a node is together with an owner of a network. In FIG. 2, "strength" is represented as a size of a node.

Figure 3:
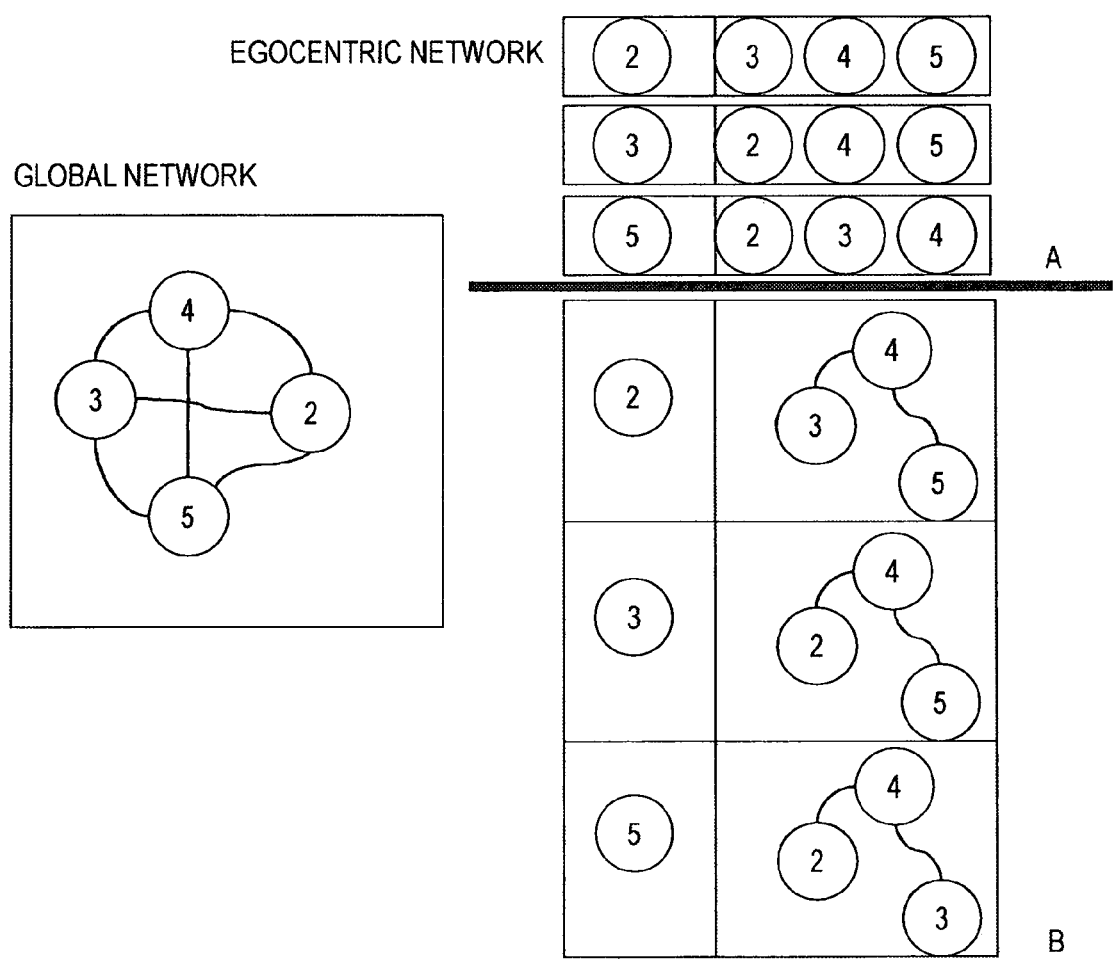
FIG. 3 is a diagram describing an example in which the egocentric network of FIG. 1 realizes characteristics of a network.

FIG. 3 describes a difference between a network of the invention and a network capable of being seen by a graph structure (called a "global network" herein) of mutually connecting users having long time for which the users are together simply. In the "global network", users u2 to u5 are mutually joined and shown. On the other hand, in the case of being seen in an "egocentric network" of the invention, it may be seen as A or may be seen as B. They construct networks by focusing on users u2, u3 and u5. The network (the uppermost line in FIG. 3) of the user u2 of A indicates the case where the user u2 is respectively together with the users u3, u4 and u5 but the users u3 to u5 are not present. The same applies to networks of the users u3 and u5 of A. A series of networks of B indicates that three persons or more are often present rather than being present in a one-to-one correspondence. Then, it is revealed that the user u4 plays an important role in personal connection formation since a node of the user u4 is in the center of links.

In the configuration example of the invention, a difference between networks unique to organizational members is found and when similar networks (many parts are constructed of the same nodes and strengths and configuration of links between the nodes are the same) are generated between the members, it can be considered that a form of communication is fixed. In the case of different networks (which are constructed of different nodes or have different strengths or configuration of links between the nodes even for the same nodes) between the members, it can be considered that a form of communication inside an organization is varied.

Embodiments of the invention will be described below in detail.

First Embodiment

First, in the invention, a first embodiment in which an organizational network is constructed from position information about organizational members will be described.

Figure 4:
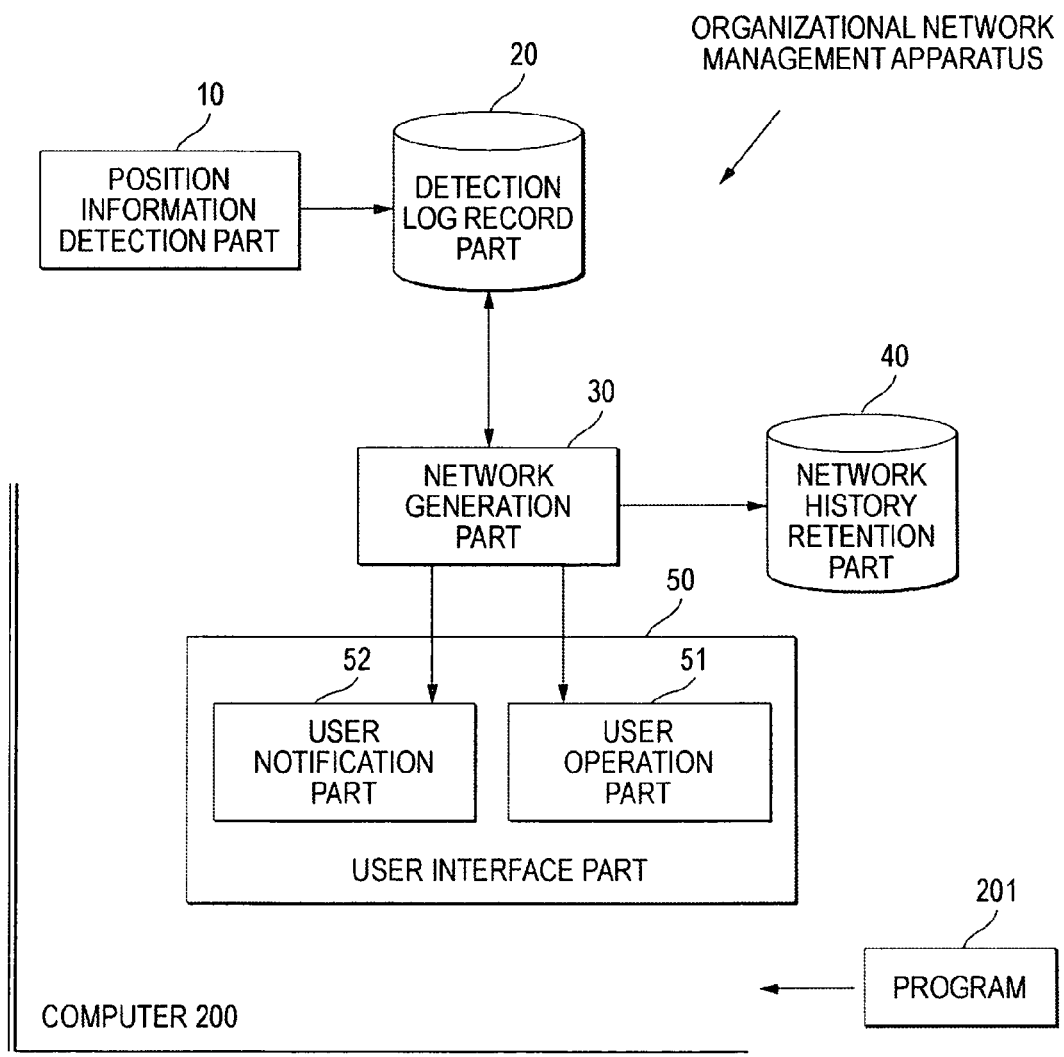
FIG. 4 is a diagram showing the whole configuration of a first embodiment of the invention.

FIG. 4 shows an organizational network analysis apparatus 100 of this embodiment as a whole and in this drawing, the organizational network analysis apparatus 100 is configured to include a position information detection part 10, a detection log record part 20, a network generation part 30, a network history retention part 40, a user interface part 50, etc. The organizational network analysis apparatus 100 may be configured using a single computer or may be configured using plural computers. The organizational network analysis apparatus 100 may be constructed of a server computer and a client computer. Concretely, the organizational network analysis apparatus 100 can be constructed by installing a program 201 in a computer 200. Each part of the organizational network analysis apparatus 100 can be constructed by together operating software resources and hardware resources of the computer 200.

Figure 5:
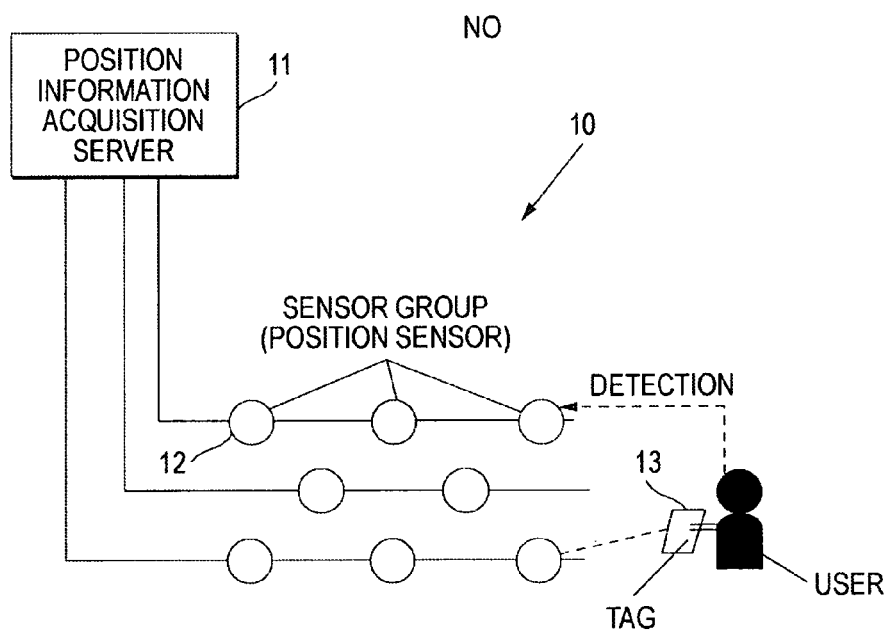
FIG. 5 is a diagram describing a configuration example of a position information detection part of FIG. 1.

As shown in FIG. 5, the position information detection part 10 is configured to include, for example, a position information acquisition server 11 and a sensor 12, and a tag 13 carried by a user is detected by the sensor 12 and position information about the user is detected. The position information acquisition server 11 uses area information as shown in FIG. 7 and user information as shown in FIG. 8. For example, by the sensors 12 disposed every area, tags of users being in the areas and a set of the users being in the areas are determined. Every time the set of the users changes, a list of users constructing its set is generated and start time and end time of its set are recorded as shown in FIG. 9. A record comprising an area ID, a user ID list (referred to by a pointer in this example), start time and end time as shown in FIG. 9 is recorded in the detection log record part 20.

The network generation part 30 forms a network every user using a log (FIG. 9) recorded in the detection log record part 20. A node of this network is a user and a relation between the users is a link and a strength of the node and a strength of the link are calculated to form the network. In this example, the network is individually formed by focusing on each of the users. By focusing on a part of the users rather than all the users, a network unique to the user may be formed. A purpose of this embodiment is typically to determine organizational rigidity and as a base material in its determination, each of the networks for all the users may be formed but each of the networks for only a part of the users selected may be formed.

A network of this embodiment is a network (egocentric network) unique to each of the users already described in FIGS. 1 to 3.

In this embodiment, a strength of a link between a user b and a user c in an egocentric network focusing on a predetermined user a at some point in time is obtained from the following formula.

Strength of link=ln(accumulated time for which users a, b, c are together)−ln(elapsed time from the point in time at which users a, b, c are last together) (Formula 1) where the strength is set at 0 when the strength of the link is less than 0.

When the strength of the link is 0, it may be constructed so as not to display the link or may indicate that the strength is 0 explicitly by an attribute of a color or a line. Also, when the strength is a predetermined threshold value (positive number) or less, it may be constructed so as not to display the link.

Also, a strength of a node of a user b in an egocentric network focusing on a predetermined user a at some point in time is obtained from the following formula.

Strength of node=ln(accumulated time for which users a, b are together)−ln(elapsed time from the point in time at which users a, b are last together) (Formula 2) where the strength is set at 0 when the strength of the link is less than 0.

When the strength of the node is 0, it may be constructed so as not to display the node or may indicate that the strength is 0 explicitly by an attribute of a color or a line. Also, when the strength is a predetermined threshold value (positive number) or less, it may be constructed so as not to display the node.

Figure 6:
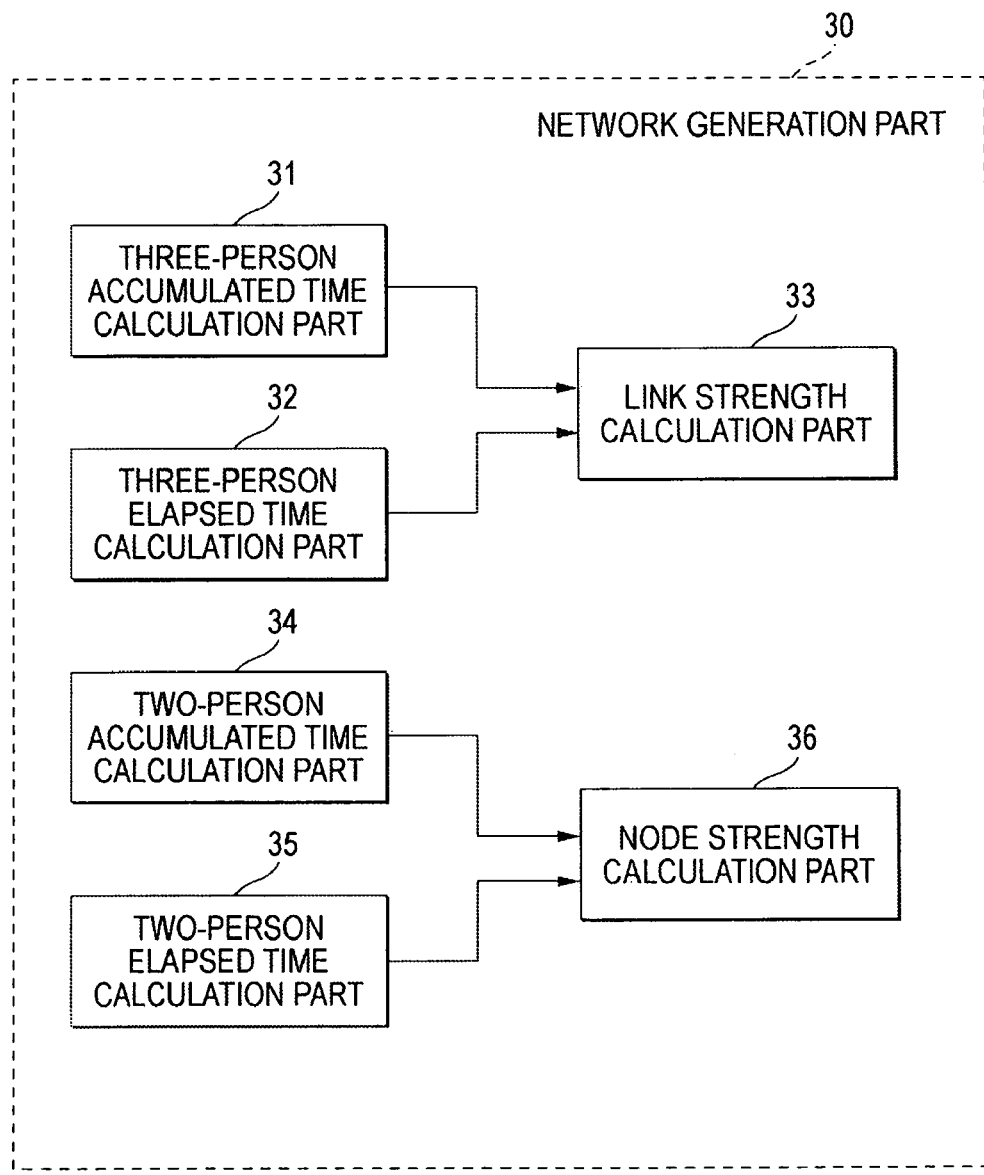
FIG. 6 is a diagram describing a configuration example of a network generation part of FIG. 1.

The network generation part 30 is configured to include a three-person accumulated time calculation part 31, a three-person elapsed time calculation part 32, a link strength calculation part 33, a two-person accumulated time calculation part 34, a two-person elapsed time calculation part 35 and a node strength calculation part 36 as shown in FIG. 6.

The three-person accumulated time calculation part 31, the three-person elapsed time calculation part 32 and the link strength calculation part 33 are used for calculating a link strength. The three-person accumulated time calculation part 31 calculates time for which three persons (for example, users a, b, c) are together by referring to the detection log record part 20. That is, records of lists including the users a, b, c are fetched from the detection log record part 20 and differences obtained by subtracting start times from end times of the records are accumulated sequentially. The three-person elapsed time calculation part 32 calculates elapsed time from time at which three persons (for example, users a, b, c) are last together to the present by referring to the detection log record part 20. That is, records of lists including the users a, b, c are fetched from the detection log record part 20 and the latest end time is obtained and by subtracting this time from the present time, elapsed time is obtained. The link strength calculation part 33 calculates the link strength by using the calculation formula described above using the accumulated time and the elapsed time.

For example, in order to generate an egocentric network focusing on a user 1001, as shown in FIG. 10, accumulated time for which the user 1001 is together with other two users (may be together with users other than the two users) and elapsed time from the time at which the user 1001 is last together with other two users are obtained and link strengths as shown in FIG. 12 are obtained based on these times. With respect to a relation between other users, a link strength is similarly obtained and strengths of the links of the egocentric network of the user 1001 are obtained. In like manner, strengths of links of egocentric networks in the case of focusing on other users are obtained.

The two-person accumulated time calculation part 34, the two-person elapsed time calculation part 35 and the node strength calculation part 36 are used for calculating a node strength. The two-person accumulated time calculation part 34 calculates time for which two persons (for example, users a, b) are together by referring to the detection log record part 20. That is, records of lists including the users a, b are fetched from the detection log record part 20 and differences obtained by subtracting start times from end times of the records are accumulated sequentially. The two-person elapsed time calculation part 35 calculates elapsed time from time at which two persons (for example, users a, b) are last together to the present by referring to the detection log record part 20. That is, records of lists including the users a, b are fetched from the detection log record part 20 and the latest end time is obtained and by subtracting this time from the present time, elapsed time is obtained. The node strength calculation part 36 calculates the node strength by using the calculation formula described above using the accumulated time and the elapsed time.

For example, in order to generate an egocentric network focusing on a user 1001, as shown in FIG. 11, accumulated time for which the user 1001 is together with another user (may be together with users other than another user) and elapsed time from the time at which the user 1001 is last together with another user are obtained and node strengths as shown in FIG. 13 are obtained based on these times. With respect to a relation between other users, a link strength is similarly obtained and strengths of the nodes of the egocentric network of the user 1001 are obtained. In like manner, strengths of nodes of egocentric networks in the case of focusing on other users are obtained.

A time stamp is added to information (link strengths and node strengths of an egocentric network of each of the users or a selected user) about a network generated by the network generation part 30 and the information is recorded in the network history retention part 40.

The user interface part 50 is means for inputting an operation from a user who manages information about a network and outputting desired information, and includes, for example, a user operation part 51 and a user notification part 52. The user notification part 52 is means for notifying a user of a message from a system (organizational network management apparatus body), and the user operation part 51 is means for presenting a retained network or requesting network generation from the system according to an operation of a user.

Figure 14:
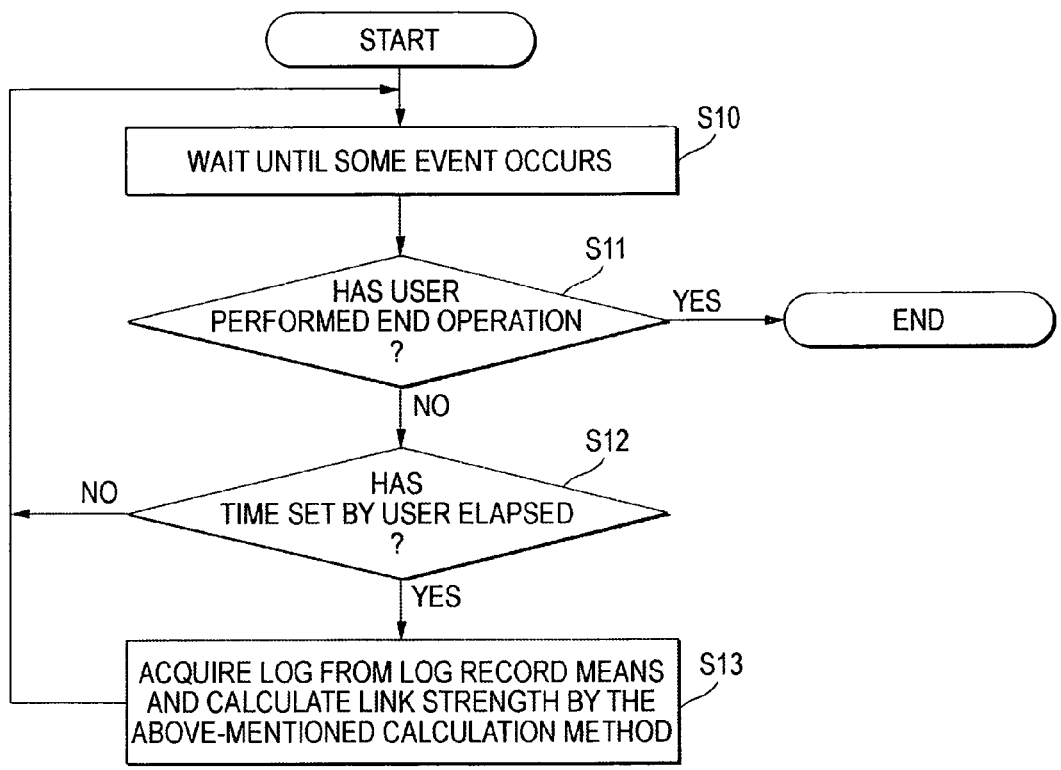
FIG. 14 is a flowchart describing an action example of the first embodiment.

FIG. 14 describes an action outline of this embodiment. In this example, occurrence of an event is monitored (S10) and when the occurrence event is a processing end action of a user, the processing is ended (S11) and when the occurrence event is a lapse of a set time (interval), a network is generated and a time stamp is added and is recorded in the network history retention part 40 (S12, S13).

In this embodiment, based on position information about a user, a network can be generated to display the contents to the user. In a form of display, as described above, display can be performed every egocentric network of a user (plural networks may be displayed in parallel on a screen) and also, a node or a link can be displayed by various display attributes according to a strength of the node or the link. Also, the past networks can be traced back to be displayed as well as a near network, and the transition can be seen.

A user who is a manager determines a difference between networks of each of the users and when similar networks (which are constructed of the same nodes and have the same strengths and configuration of links between the nodes) are generated between the users, it can be decided that a form of communication is fixed (an organization is rigid). When different networks (which are constructed of different nodes or have different strengths or configuration of links between the nodes even for the same nodes) are generated between the users, it can be decided that a form of communication inside an organization is varied (an organization is not rigid).

Second Embodiment

Next, a second embodiment of the invention will be described. In this embodiment, a rigidity calculation part 60 is disposed in the configuration of the first embodiment.

Figure 15:
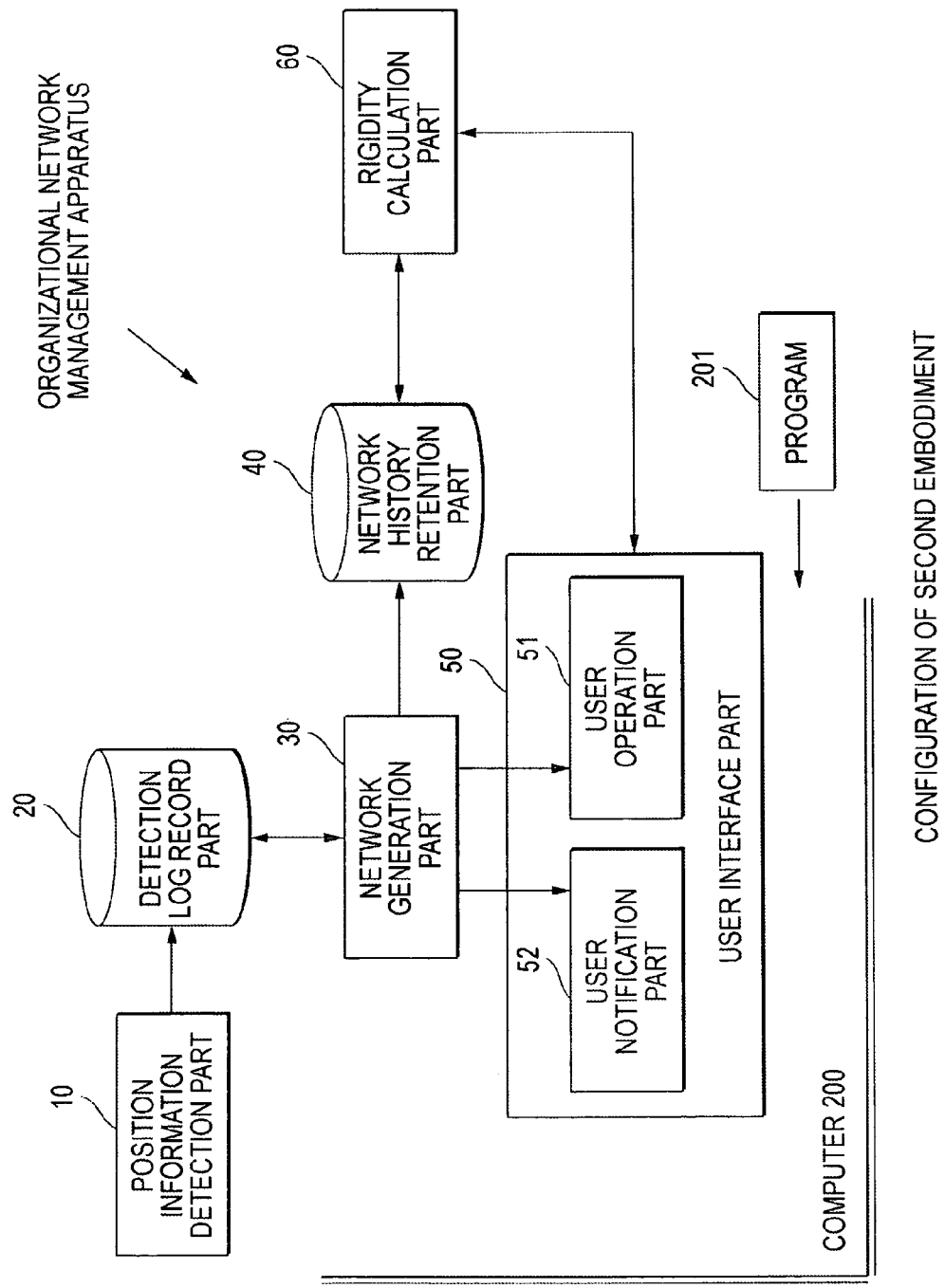
FIG. 15 is a diagram showing a configuration of a second embodiment of the invention as a whole.

FIG. 15 shows a configuration of this second embodiment as a whole and in this drawing, corresponding numerals are assigned to corresponding parts of FIG. 4. In this embodiment, the rigidity calculation part 60 fetches network information about a predetermined time stamp kept in a network history retention part 40 and calculates uniformity or similarity between each of the egocentric networks. Typically, in order to calculate the present organizational rigidity, network information about a near time stamp is acquired and uniformity or similarity between each of the near egocentric networks is calculated. A targeted egocentric network may be sampled to obtain rigidity. In uniformity or similarity used as a criterion of rigidity, for example, with respect to a strength of a link and a strength of a node of a network, mutual networks may be mapped to obtain the distance (difference between strengths). Also, the number of nodes with strengths of a predetermined range may be obtained or the number of links with strengths of a predetermined range may be obtained similarly. The rigidity may be obtained by a criterion opposite to the uniformity or similarity rather than uniformity or similarity between networks. For example, variance, standard deviation or entropy may be adopted, or they may be combined.

When an index of organizational rigidity exceeds a predetermined threshold value, it is decided that an organization is rigid or may be rigid, and a user may be notified or warned of that effect. Also, when a difference between this index and the previous or the predetermined past index of rigidity exceeds a predetermined threshold value, notification or warning may be given.

Third Embodiment

Next, a third embodiment of the invention will be described. In this embodiment, electronic communication is detected to generate a network instead of generating a network based on physical position information about a user.

FIG. 16 shows this embodiment and in this drawing, corresponding numerals are assigned to corresponding parts of FIG. 4 or FIG. 15.

FIG. 16, an instant message system 70 supplies instant message service to a user. A communication detection part 80 detects that an instant message is communicated between plural users, and records its detection log in a detection log record part 20 and based on this detection log, a network is generated.

Incidentally, instead of the instant message system 70, it may be applied to an electronic mail system or may be applied to a document browse server (including a WWW server). For the electronic mail system, for example, a focused user calculates a node strength or a link strength based on mail or broadcast mail. For the document browse server, a node strength or a link strength is calculated by focusing on simultaneous access.

In short, when attention is focused on a predetermined user and the user and other two users (other users may participate) perform a predetermined act, evaluation is made as a link strength and when attention is focused on a predetermined user and the user and another user (other users may participate) perform a predetermined act, evaluation is made as a node strength. In the case of an act of a form in which plural users can participate or can be related thus, its act can be detected to generate network information.

Incidentally, the invention is not limited to the embodiments described above, and various changes can be made without departing from the gist. For example, in the embodiments described above, both of the node strength and the link strength have been used, but only one of the strengths may be evaluated. For example, only the link strength may be obtained. In this case, it may be constructed so as not to display an isolated node. Also, only the node strength may be obtained. In this case, when the node strength is 0, the node is not displayed and it may also be constructed so as not to display a link whose one end is not closed to the node.

As discussed above, in an illustrative, non-limiting embodiment, a personal connection network analysis apparatus is provided with event history holding means (detection log record part 20) for holding a history of an event related to a member belonging to an organization, relation calculation means (network generation part 30, link strength calculation part 33, FIG. 6) in which with respect to respective at least part of the members, histories of events related to both of the member and other plural members are extracted from the event history holding means and a relation between the other plural members is calculated, and network information holding means (network history retention part 40) for holding the relation between the other plural members calculated by the relation calculation means as link information between nodes of a personal connection network unique to the respective at least part of the members.

In this configuration, in a personal connection network unique to a member, a relation between the other plural members is calculated based on events related to both of the member and other plural members and the personal connection network is constructed as link information between nodes corresponding to the other members. The relation between the other members can be grasped from the standpoint of each of the members.

In this configuration, the event is typically an event in which plural members are in the same place, but is not limited to this. It is determined whether or not the members are in the same place, for example, using detection means for detecting position information about a member.

Incidentally, an organization may be any organization as long as organizational members can be identified, and may a company, an intra-company organization, a project, a company lateral organization, etc. It may be a group comprising participants in an electronic community formed by communication by electronic messages of an electronic bulletin board, etc.

The relation calculation means, for example, accumulates time for which the member and other plural members are in the same place with respect to the respective at least part of the members, and calculates a relation between the other members with respect to the member based on the accumulated time.

Rigidity decision means for deciding rigidity of the organization by comparing the mutual personal connection networks using link information about personal connection networks unique to the respective at least part of the members may be disposed. For example, corresponding parts may be mapped to obtain the distance. It may simply be decided by the total number of links present in both the parts or the total number of links with values in a predetermined range.

Also, it may be constructed so that the relation calculation means (network generation part 30, node strength calculation part 36, FIG. 6) extracts histories of events related to both of the member and respective other members with respect to the respective at least part of the members from the event history holding means and calculates a relation between the member and the respective other members, and the network information holding means (network history retention part 40) holds the relation between the member and the respective other members calculated by the relation calculation means as node information about a personal connection network unique to the respective at least part of the members.

In this case, for example, it may be constructed so that the event is an event in which plural members are in the same place, and the relation calculation means obtains time for which the member and respective other members are in the same place with respect to the respective at least part of the members and accumulates time for which the member and the respective other members are in the same place with respect to the respective other members and calculates a relation between the member and the respective other members based on the accumulated time.

Rigidity of the organization may be decided by comparing the mutual personal connection networks using node information and link information about personal connection networks unique to the respective at least part of the members. Also in this case, for example, corresponding parts may be mapped to obtain the distance. It may simply be decided by the total number of nodes or the total number of links present in both the parts, or by the total number of nodes with values in a predetermined range or the total number of links with values in a predetermined range. It is decided whether or not a difference between values of corresponding links or nodes is smaller than a predetermined threshold value and based on that decision result, comparison may be made.

The event may be communication between plural members and in this case, the event is typically communication by electronic message transmission but may be communication by normal sound. For electronic mail, a broadcast message may be used as an event. The fact of simultaneously participating in (accessing) electronic communication may be used as an event.

Also, display means for displaying the personal connection network using link information between nodes of a personal connection network unique to the respective at least part of the members may be disposed.

Also, in another illustrative, non-limiting embodiment, an organizational rigidity determination apparatus is provided with event history holding means (detection log record part 20) for holding a history of an event related to a member belonging to an organization, relation calculation means (network generation part 30) in which with respect to respective at least part of the members, histories of events related to both of the member and other plural members are extracted from the event history holding means and a relation between the other plural members is calculated, network information holding means (network history retention part 40) for holding the relation between the other plural members calculated by the relation calculation means as link information about a personal connection network unique to the respective at least part of the members, and rigidity decision means (rigidity calculation part 60, FIG. 15) for deciding rigidity of the organization by comparing the mutual personal connection networks using link information about the personal connection networks unique to the respective at least part of the members.

In this configuration, from the standpoint of individual members, a personal connection network is grasped and based on this, rigidity of the organization can be determined. When there is no difference between unique personal connection networks viewed from individual members, it is decided that the organization is rigid and when the difference is large, it is decided that the organization is not rigid.

Also in this case, it may be constructed so that the relation calculation means (network generation part 30, node strength calculation part 36, FIG. 6) extracts histories of events related to both of the member and respective other members with respect to the respective at least part of the members from the event history holding means and calculates a relation between the member and the respective other members, and the network information holding means (network history retention part 40) holds the relation between the member and the respective other members calculated by the relation calculation means as node information about a personal connection network unique to the respective at least part of the members.

Incidentally, the invention not only can be implemented as an apparatus or a system but also can be implemented as a method. Also, a part of the invention can naturally be constructed as software. Also, a software product used for making a computer execute such software is naturally included in the technical scope of the invention.

The entire disclosure of Japanese Patent Application No. 2005-241537 filed on Aug. 23, 2005 including specification, claims, drawings and abstract is incorporated herein by reference in its entirety.

The invention claimed is:

1. A personal connection network analysis apparatus comprising:
    an event history unit that holds histories of events related to organization members;
    a human social relationship calculation unit that extracts from the event history unit, histories of events common to both a first member of the organization members and second members of the organization members and calculates a first human social relationship between the second members based on the extracted histories of events;
    a network information holding unit that holds the calculated first human social relationship as link information between a plurality of nodes to represent a personal connection network unique to the first member, the nodes being respectively indicative of the second members in the personal connection network unique to the first member;
    a network generation unit that extracts the link information and the plurality of nodes from the network information holding unit and forms an organizational network from the personal connection network unique to the first member by determining a strength of the nodes and a strength of the link information; and
    a position information detection part that detects the physical presence of the members in a room by identifying a tag carried by the members and by determining position information about the members, wherein
    the strength of the link information is calculated as a function of an accumulated time in which the members are physically together based on the information provided by the position information detection part, and an elapsed time from a point in time that the members were last physically together for a duration of time based on the information provided by the position information detection part.

2. A personal connection network analysis apparatus as claimed in claim 1, wherein an event is when plural ones of the organization members are in a same place, and the plural ones of the organization members include, but not limited to, the first and second members.

3. A personal connection network analysis apparatus as claimed in claim 2, further comprising:
    a determination unit that determines an event based on the position information detected by the detection unit.

4. A personal connection network analysis apparatus as claimed in claim 3, wherein the human social relationship calculation unit accumulates time for which the first member and the second members are in a same place, and calculates a relation between the second members based on the accumulated time.

5. A personal connection network analysis apparatus as claimed in claim 1, wherein:

the human social relationship calculation unit extracts, from the event history unit, histories of events common to the first member and each of the second members and calculates a second human social relationship between the first member and each of the second members; and the network information holding unit holds the second human social relationship between the first member and each of the second members as node information of the personal connection network unique to the first member.

6. A personal connection network analysis apparatus as claimed in claim 5, wherein:

an event is when plural ones of the organization members are in a same place, and the plural ones of the organization members include, but are not limited to, the first and second members; and the human social relationship calculation unit obtains and accumulates time for which the first member and each of the second members are in a same place and calculates a third human social relationship between the first member and each of the second members based on the accumulated time.

7. A personal connection network analysis apparatus as claimed in claim 1, wherein an event is communication between plural ones of the organization members, and the plural ones of the organization members include, but not limited to, the first and second members.

8. A personal connection network analysis apparatus as claimed in claim 7, wherein the communication is communication by electronic message transmission.

9. A personal connection network analysis apparatus as claimed in claim 1, further comprising:

a display unit that displays the personal connection network unique to the first member using the link information between the nodes.

10. A personal connection network analysis method executed using a processor, comprising:

holding histories of events related to organization members;

extracting, from the held histories of events, histories of events common to both a first member of the organization members and second members of the organization members and calculating a human social relationship between the second members based on the extracted histories of events;

holding the calculated human social relationship as link information between a plurality of nodes of a personal connection network unique to the first member, the nodes being respectively indicative of the second members in the personal connection network unique to the first member;

generating an organizational network from the personal connection network unique to the first member by determining a strength of the nodes and a strength of the link information; and detecting the physical presence of the members in a room by identifying a tag carried by the members and by determining position information about the members, wherein the strength of the link information is calculated as a function of at least one of an accumulated time in which the members are physically together as determined by the position information, and an elapsed time from a point in time that the members were last physically together for a duration of time as determined by the position information, wherein the steps are performed by a processor.

11. A storage medium readable by a computer, the storage medium storing a program of instructions executable by the computer to perform a function for a personal connection network analysis, the function comprising:

holding histories of events related to organization members;

extracting, from the held histories of events, histories of events common to both a first member of the organization members and second members of the organization members and calculating a human social relationship between the second members based on the extracted histories of events;

holding the calculated human social relationship as link information between nodes of a personal connection network unique to the first member, the nodes being respectively indicative of the second members in the personal connection network unique to the first member;

generating an organizational network from the personal connection network unique to the first member by determining a strength of the nodes and a strength of the link information; and detecting the physical presence of the members in a room by identifying a tag carried by the members and by determining position information about the members, wherein the strength of the link information is calculated as a function of at least one of an accumulated time in which the members are physically together as determined by the position information, and an elapsed time from a point in time that the members were last physically together for a duration of time, as determined by the position information.

* * * * *